US011720868B2

(12) United States Patent
Lemaire et al.

(10) Patent No.: US 11,720,868 B2
(45) Date of Patent: Aug. 8, 2023

(54) METHOD AND SYSTEM FOR CARRYING OUT A PAYMENT TRANSACTION ON A BANK TERMINAL USING AN ELECTRONIC DEVICE

(71) Applicant: THALES DIS FRANCE SAS, Meudon (FR)

(72) Inventors: François Lemaire, Meudon (FR); Jean Lambert, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 208 days.

(21) Appl. No.: 16/753,150

(22) PCT Filed: Oct. 2, 2018

(86) PCT No.: PCT/EP2018/076876
§ 371 (c)(1),
(2) Date: May 8, 2020

(87) PCT Pub. No.: WO2019/068742
PCT Pub. Date: Apr. 11, 2019

(65) Prior Publication Data
US 2020/0356968 A1 Nov. 12, 2020

(30) Foreign Application Priority Data
Oct. 3, 2017 (EP) .................................. 17306324

(51) Int. Cl.
*G06Q 20/10* (2012.01)
*G06Q 20/40* (2012.01)

(52) U.S. Cl.
CPC ....... *G06Q 20/1085* (2013.01); *G06Q 20/105* (2013.01); *G06Q 20/409* (2013.01)

(58) Field of Classification Search
CPC ............ G06Q 20/1085; G06Q 20/105; G06Q 20/409; G06Q 20/3574
See application file for complete search history.

(56) References Cited

U.S. PATENT DOCUMENTS

| | | | |
|---|---|---|---|
| 8,196,131 B1 * | 6/2012 | von Behren | G06Q 20/382 705/64 |
| 9,633,346 B2 * | 4/2017 | Goodwin, III | G07F 19/20 |

(Continued)

FOREIGN PATENT DOCUMENTS

WO    WO-2009055704 A2 *   4/2009   ........... G06Q 10/087

OTHER PUBLICATIONS

PCI Security Standards Council: PCI Mpbile Payment Acceptance Security Guidance for Developers, Sep. 2017, pp. 1-22 (Year: 2017).*

(Continued)

*Primary Examiner* — Bijendra K Shrestha

(57) ABSTRACT

The invention relates to a method for carrying out a payment transaction on a bank terminal using an electronic payment device, where the device contains at least two payment applications. The method includes a step of data communication from the device to the terminal during a transaction, which data contains at least information of a first type identifying each payment application of the device; and a step of configuring the device so that the data provides information of a first type relative to at least one disabled payment application. The invention likewise relates to the corresponding system.

10 Claims, 6 Drawing Sheets

(56) References Cited

U.S. PATENT DOCUMENTS

| | | | | |
|---|---|---|---|---|
| 2001/0014885 A1* | 8/2001 | Yanagi | ................ | G06Q 20/341 |
| | | | | 705/65 |
| 2009/0112766 A1* | 4/2009 | Hammad | ............... | G06Q 20/10 |
| | | | | 705/44 |
| 2012/0323942 A1 | 12/2012 | Iversen | | |
| 2016/0117670 A1* | 4/2016 | Davis | .................. | G06Q 20/386 |
| | | | | 705/39 |
| 2017/0061461 A1* | 3/2017 | Jajara | .................. | G06Q 20/367 |

OTHER PUBLICATIONS

Chen et al.: The Design of secure coupon mechanism with the implementation for NFC smartphones, Jul. 7, 2016, Computer and Engineering, 59 (2017), pp. 204-217 (Year: 2016).*

Gupta et al.: A New Framework for Credit Card Transactions involving Mutual Authentication between Cardholder and Merchant, , 2011, 2011 International Conference of Communication System and Network Technologies, pp. 22-26 (Year: 2011).*

EMV Co LLC: EMV Specifications for Payment Systems, Book B, Entry Point Specification, Version 2.6, Jul. 2016, pp. 1-52 (Year: 2016).*

International Search Report (PCT/ISA/210) dated Oct. 26, 2018, by the European Patent Office as the International Searching Authority for International Application No. PCT/EP2018/076876.

Written Opinion (PCT/ISA/237) dated Oct. 26, 2018, by the European Patent Office as the International Searching Authority for International Application No. PCT/EP2018/076876.

* cited by examiner

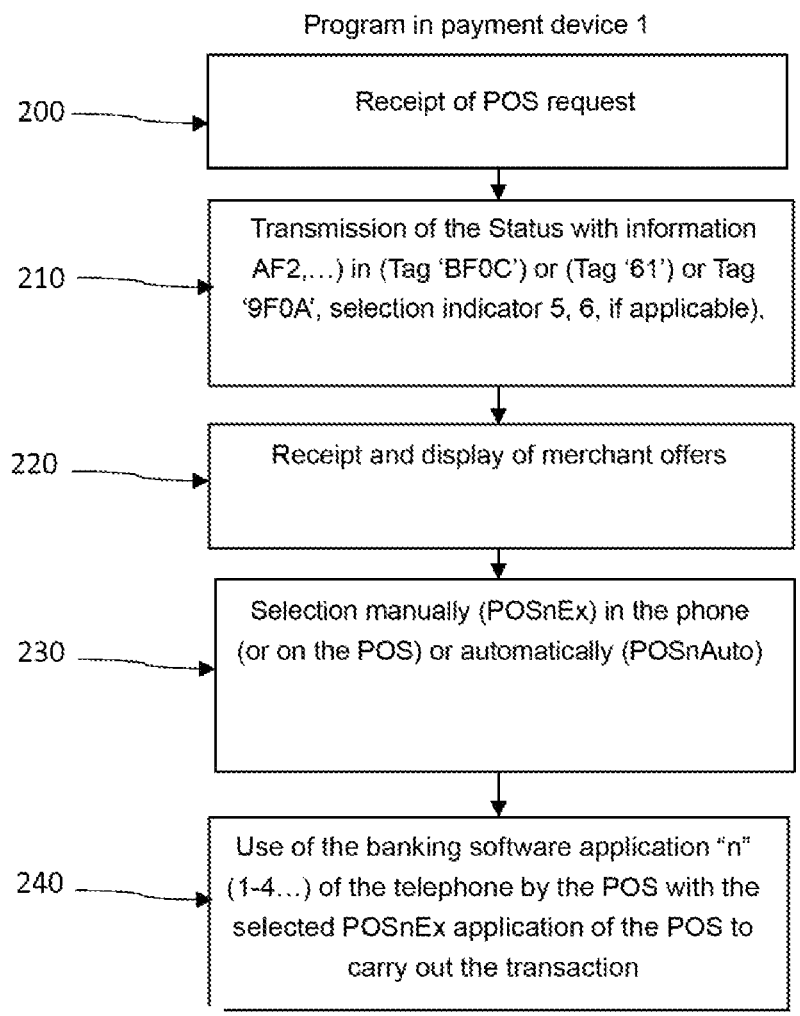

METHOD AND SYSTEM FOR CARRYING OUT A PAYMENT TRANSACTION ON A BANK TERMINAL USING AN ELECTRONIC DEVICE

FIELD OF THE INVENTION

The invention relates to a method and a system for carrying out a payment transaction on a bank terminal with an electronic device comprising a plurality of payment applications.

More particularly, the method or system implements (or is configured to perform) the communication of information relating to a plurality of payment applications. Preferably, the invention complies or is compatible with banking standards, in particular the EMV standard.

The invention relates more particularly to electronic devices equipped with electronic transaction software applications. The transactions target, but are not limited to, electronic contact or contactless proximity payment transactions. Targeted here are NFC (Near Field Communication) proximity transactions, for example by means of radio frequency communications according to ISO 14443. Transactions using (QR code) (two-dimensional bar code) can be targeted.

These devices comprise electronic communication devices (mobile phone, tablet, PDA personal assistant, wearable electronic accessories such as communicating watches or NFC). The payment device can also be any support for payment applications or any payment device, including in particular the smart card. Some smart cards can comprise user interfaces (screen, keyboard, biometric sensor, etc.) and/or various communication interfaces (NFC, ISO 7816, Bluetooth, etc.)

Some of these devices are intended for electronic transactions, in particular financial transactions, such as purchases that can be carried out online via the internet on merchant sites, but also locally at merchants using a POS payment terminal (Point of Sale payment terminal in Anglo-Saxon terminology), automatic teller machines (ATM) or ATM (Automatic Teller Machines in Anglo-Saxon terminology), automatic vending machines for goods such as fuel, drinks, etc., in restaurants company, shops . . . .

PRIOR ART

A method currently exists for carrying out a payment transaction on a bank terminal with an electronic payment device (mobile phone) comprising several payment applications. This process conforms to the EMV standard and is illustrated in FIGS. 1 and 2.

The method known above provides that the terminal sends an interrogation request (SELECT) from a list of banking applications present and activated by a user on the device; also provided is that the payment device sends a response (STATUS) to this request. The response, which complies in particular with EMV, comprises information relating to at least one payment application if the latter has been activated.

The document US 2009/0112766 A1 describes a method for selecting one or more payment applications in a point of sale terminal and which give benefits for the consumer among a plurality of payment applications and in using the selected one to carry out a transaction of payment. According to one embodiment, the selection can be automatic to select an optimised benefit.

Technical Problem

The inventors have observed that the EMV payment method is ill-suited, limited, and impractical to allow commercial offers to be made according to the banking applications present in a payment device of a client user.

The current payment process limits the transaction possibilities or functionalities.

Object of the Invention

The object of the invention is in particular to solve the above-mentioned drawbacks or to satisfy the need anticipated above.

In particular, the invention aims to allow merchants to influence a customer user in the choice of a payment software application or an electronic virtual bank card in carrying out the next proximity payment transaction among those present.

The invention also aims to provide an improved user experience in the carrying out of payment transactions, while avoiding complex and costly changes in the existing payment infrastructure, preferably based on an established EMV framework.

The invention also aims to allow the user to more easily choose and/or execute a transaction according to his/her own criteria, from one or the other present payment application.

SUMMARY OF THE INVENTION

According to one aspect, the invention consists in associating benefits (or any other incentive measure) with at least one of the payment applications present to encourage a choice of one payment application rather than another.

Advantageously, the choice of the user can be widened despite limitations of voluntary or unintentional use, whether accidental or not by the user. The choice of the user can be made from activated and/or even disabled payment software applications located in a user payment device. In other words, the invention makes it possible to propose different special offers depending on the choice of the activated or disabled payment application that the client user chooses for the transaction.

The invention also makes it possible to give a set of various information relating to the payment applications activated and disabled in the payment device. The invention allows more flexibility and widening of options in the selection of payment applications while respecting the operating constraints of standards, in particular EMV.

To this end, the object of the invention is a method for carrying out a payment transaction on a bank terminal with an electronic payment device, said device comprising at least two software payment applications, said method comprising:

a step of communicating data from the device to the terminal during a transaction, said data comprising at least information of a first type identifying each payment application of the device; the method being characterised in comprising a step of configuring the device so that said data comprises information of a first type (ADF) relating to at least one disabled payment application.

According to other preferred characteristics or modes
the method implements a step of associating economic values of benefits (or other measure) for the use of one and/or the other payment application and a step of configuring the terminal to make a direct selection by the user (notably manual interaction by the user during the transaction) or an automatic selection in the terminal of a payment application according to these benefits (or an associated measure);

The data can preferably comprise information of a first type relating to at least one disabled application; thus, due to this very practical feature, all applications, even when disabled, are detected by a POS without user intervention.

And, the selection of an application at the time of the transaction is also more practical for a user as there is no need to intervene prior to activation and to be aware of information associated with the application. The invention also makes it possible to overcome a forgetfulness by the user to initially activate the application, or to reactivate following a problem of fortuitous temporary blocking of the application by the user or of the authorisation server. The invention provides flexibility in the operation of the system for the detection and selection of an existing application in a user's electronic payment device.

The method can comprise a step of storing said data in a directory of the device reserved for activated applications;

The data can comprise information of a second type indicating whether a disabled application is blocked at the authorisation server;

The method can comprise a step of configuring the device so that said communicated data comprises information of a third type relating to categories of preferential benefits (PR, Pb, Pc). These can be preselected by a user in the user's device.

The data communicated can preferably be placed in a discretionary data field of the FCI issuers (Tag 'BF0C'), in a field of directory entries (Tag '61') or in a proprietary data field of the saved application selection (ASRPD, Tag '9F0A').

The invention also relates to a system corresponding to the above method. In particular, the invention relates to a system for carrying out a payment transaction on a bank terminal with an electronic payment device, said device comprising at least two software payment applications, said system being configured to:

perform a data communication from the device to the terminal during a transaction, said data comprising at least information of a first type identifying each payment application of the device; the system being characterised in that the device is configured so that said data comprises information of a first type (ADF) relating to at least one disabled payment application.

According to other characteristics, the system can comprise a banking server centre and/or a merchant server centre and in being configured so that the device and/or the terminal interrogate(s) one of said servers during a transaction to obtain additional economic information or to interact with these servers.

The invention has the benefit of being able to be completely compatible with the existing EMV infrastructure, that is to say that the payment device equipped with this solution will always operate within a normal EMV infrastructure.

The invention has the benefit of offering the merchant an opportunity to regain control of the payment application used for the transaction. This is done by obtaining information relating to the payment applications available in the user's electronic wallet (activated or disabled, priority or non-priority) and by proposing commercially more favourable payment alternatives.

Thus, the merchant can, for example, avoid a payment application with high transaction costs and offer cheaper alternatives. The difference in fees can be shared between the merchant and the user in a manner decided by the merchant: direct reduction in prices, reimbursement, loyalty points, coupons, vouchers, etc.

The payment application in the payment device can be dynamically updated by the user's issuing bank with information such as the activation status, a white list of merchants, a black list of merchants, the membership in a loyalty program, etc.

In addition, the user can configure a more or less automatic course of transactions. The user can also select/configure his/her economic preferences so that the merchant's POS takes this into account (or a remote merchant server linked to the POS).

BRIEF DESCRIPTION OF THE FIGURES

FIGS. 8 and 9, respectively, illustrate steps (according to a preferred embodiment of the invention) of a corresponding method or program for the payment device 1 and for the payment terminal 2.

DESCRIPTION

The same reference symbols from one figure to another, indicate identical or similar constituents.

Figure 1:
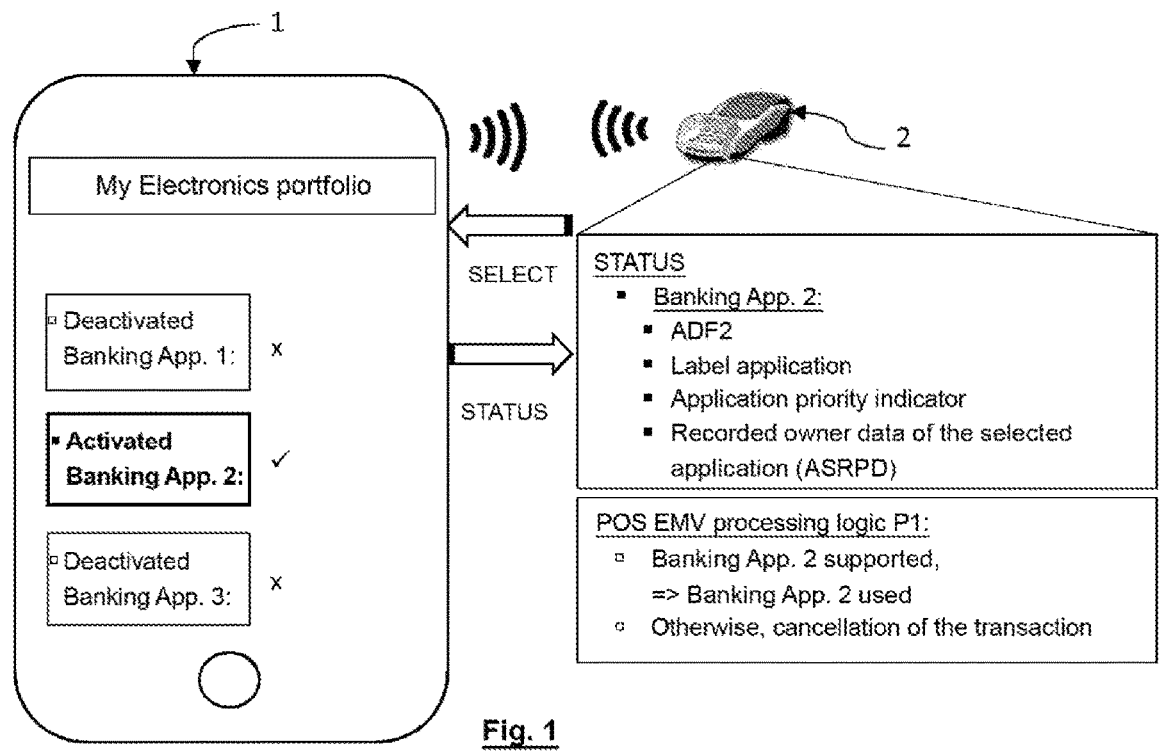
FIGS. 1 and 2 illustrate the current method and system for a payment transaction between a POS and a mobile phone with contactless electronic payment application, according to the prior art.

In FIG. 1 are illustrated a current method and system, illustrating the prior art, for carrying out a payment transaction between a POS (1) and a mobile telephone (2) provided with contactless electronic payment applications (3).

The POS payment terminal conforms to those on the market, and comprises a secure structure and EMV (Europay Mastercard Visa) approved/standardised functions, which is the international standard for secure payment transactions. The POS can be equipped in particular with a contact or contactless card reader, and human/machine interface(s) such as keyboard, screen as well as contactless communication means, in particular NFC (Near Field Communication—proximity radio frequency) with telephone 2. It can preferably be equipped with a security module with an electronic chip SAM and encrypted electronic means for communicating with a central bank server (in particular for periodic collection of transaction and/or update information), or a server of (or for) merchants.

Meanwhile, the payment device (called electronic payment wallet) can constitute or comprise any payment device with payment banking applications which simulate/emulate bank cards (for example smart watch, badge, electronic purse bracelet . . . ). The device 1 is here in the form of a telephone. It can comprise a contactless card emulation function according to the ISO 14443 and/or ISO/IEC 18092 standard so as to communicate with the POS while being perceived thereby as a contactless smart card.

Electronic circuits or integrated circuit chips are also incorporated. A person/machine interface is incorporated here in the form of a touch screen. Applications or application operating programs stored in memory, in particular EEPROM or flash, are integrated in particular for carrying out banking, loyalty, or other operations. These application programs are executed by a main processing unit µC2 or in one or more electronic circuits or electronic chips with associated integrated circuits such as an electronic security element "eSE".

According to the EMV standard, the method or system implements a "SELECT" request from the POS terminal 1 to the telephone (or payment device) and a "status" response from the payment device 2 to the POS; this response comprises first information relating to at least one payment application only if the latter is activated. In fact, the EMV flow comprises the command "SELECT PSE or PPSE" (this is the directory application) from the POS to the device, then the device sends a response with "STATUS", then the POS sends the command "SELECT APP." to select an application. The "SELECT" command mentioned in the figures corresponds more precisely to the "SELECT PPSE" command.

In the example FIG. 1, illustrating the prior art, the telephone 1 comprises three bank payment transaction applications simulating electronic cards 1-3 of which only the card or payment application 2 is activated.

According to the invention, the term "activated" for a banking application signifies that the user has selected from banking applications present in his/her device an application which he/she wishes to use during a next transaction. On the technical level, within the meaning of the EMV standard and corresponding software, an "activated" application status causes the memorisation of information/characteristics of an application in a PPSE (Proximity Payment System Environment) register/directory (only in contactless). Only applications which are activated (and not blocked by a bank issuer) are listed in this PPSE register.

In the "STATUS" response to a "SELECT" request, it is the information of the activated applications comprising an application identifier "ADF", contained in this register which is transmitted to the POS by the device. When the device is a contactless card, the PPSE contains the list of all bank card applications supported by the contactless interface; the content thereof is returned by the card in response to a SELECT command from the reader. If there are several applications in the list of candidates, either the terminal chooses the application preferred thereby, or the selection is given to the carrier. After the completion of this step, the terminal selects the application.

During an initial exchange (including an ATR), the card (or the telephone) returns a "status" with information concerning the card or bank payment application 2. The information here comprises at least the "ADF Name" (Application Definition File, Tag '4F') as defined in the EMV standards: "EMV Contactless Specifications for Payment Systems—Book B—Entry point Specification). Other data can be returned, such as the application label (Tag '50', optional) or the Application Priority Indicator (Tag '87', conditional). The "ADF Name" allows the payment terminal to identify the means of payment (payment software application) on the electronic device, as specified in the EMV standard.

Upon receipt of the STATUS information, an EMV processing logic below is then executed by the POS. If the POS supports the payment application 2 (or bank card 2), then the payment application 2 is used by the POS for the next payment transaction. Otherwise, the payment transaction is cancelled. The POS 2 here does not recognise the disabled banking applications 1 and 3 present in the phone 1.

Figure 2:
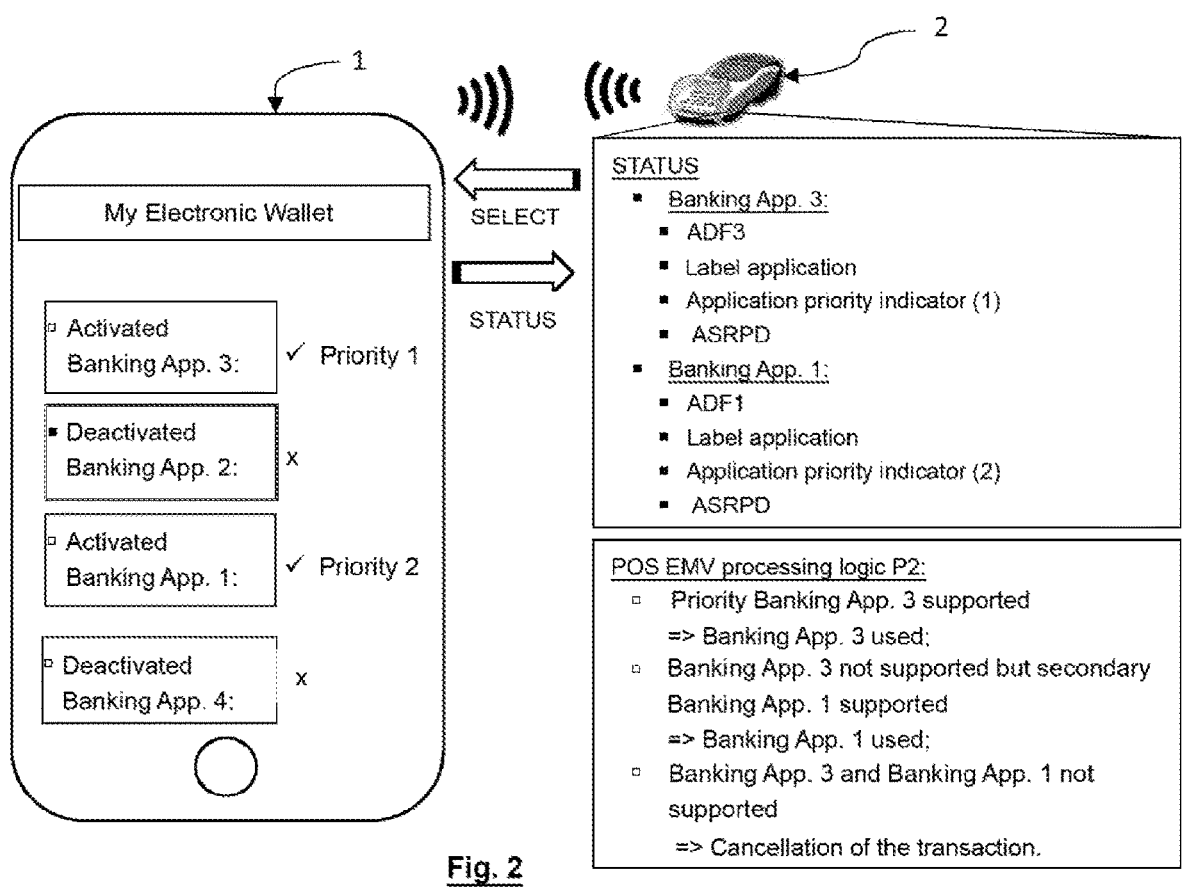

In FIG. 2, the system or method differs in comprising four applications or payment cards among which the banking application 3 of high priority 1 and the banking application 1 of low priority 2 are activated.

The "status" is transmitted to the POS in the same way as above, but here by indicating two activated applications 3 and 1 as well as the priority level (1 and 2) thereof. In this case, and according to the most conventional embodiment in the EMV standard, the following EMV processing logic is executed by the POS.

If the POS supports the banking application 3 with higher priority 1, then the banking application 3 is used; if the POS does not support the banking application 3 but supports the banking application 1 with lower priority 2, then the banking application 1 is used; if the POS does not support either, then the transaction is cancelled. There can be override modes in the EMV standard where the payment terminal has been configured to force the use of the second priority application.

Specified here is that the POS 2 ignores all of the disabled banking applications 2 and 4 present in the phone 1. (Being disabled, the PPSE does not contain the identifier thereof (ADF) according to the EMV standard).

Figure 3:
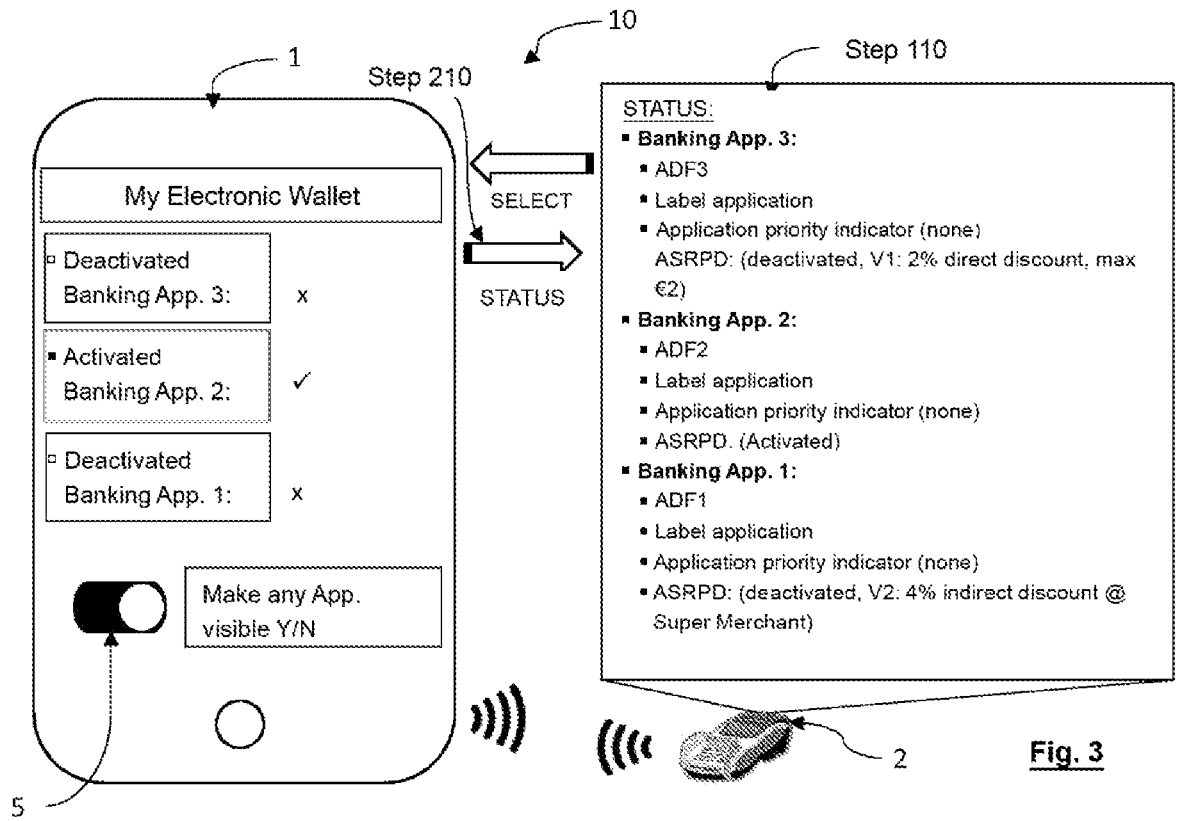
FIG. 3 illustrates a first preferred mode of implementation of the electronic payment transaction method of the invention (and corresponding system)
Figure 3:
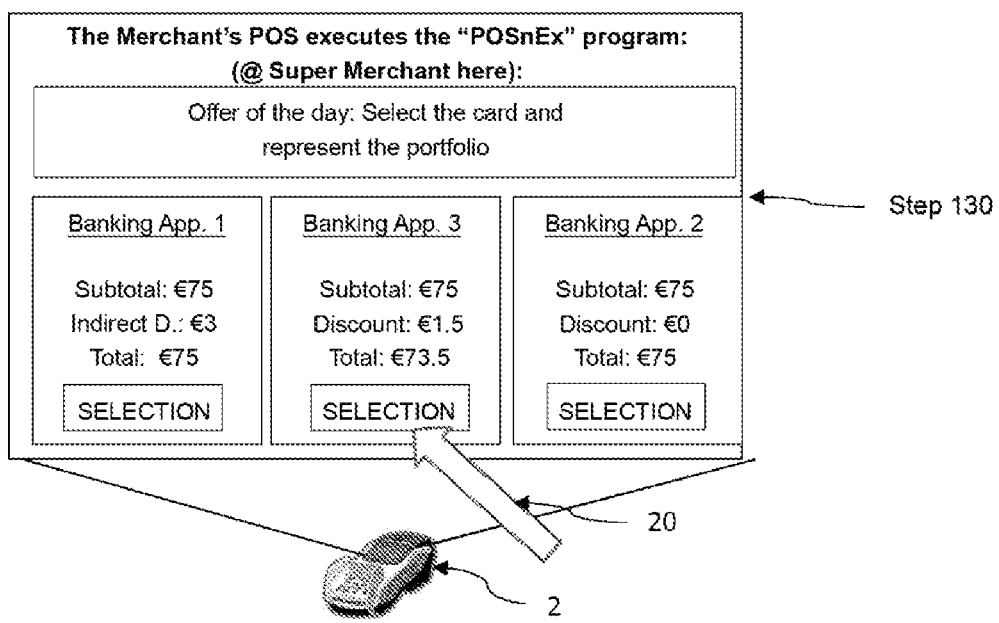
Figure 4:
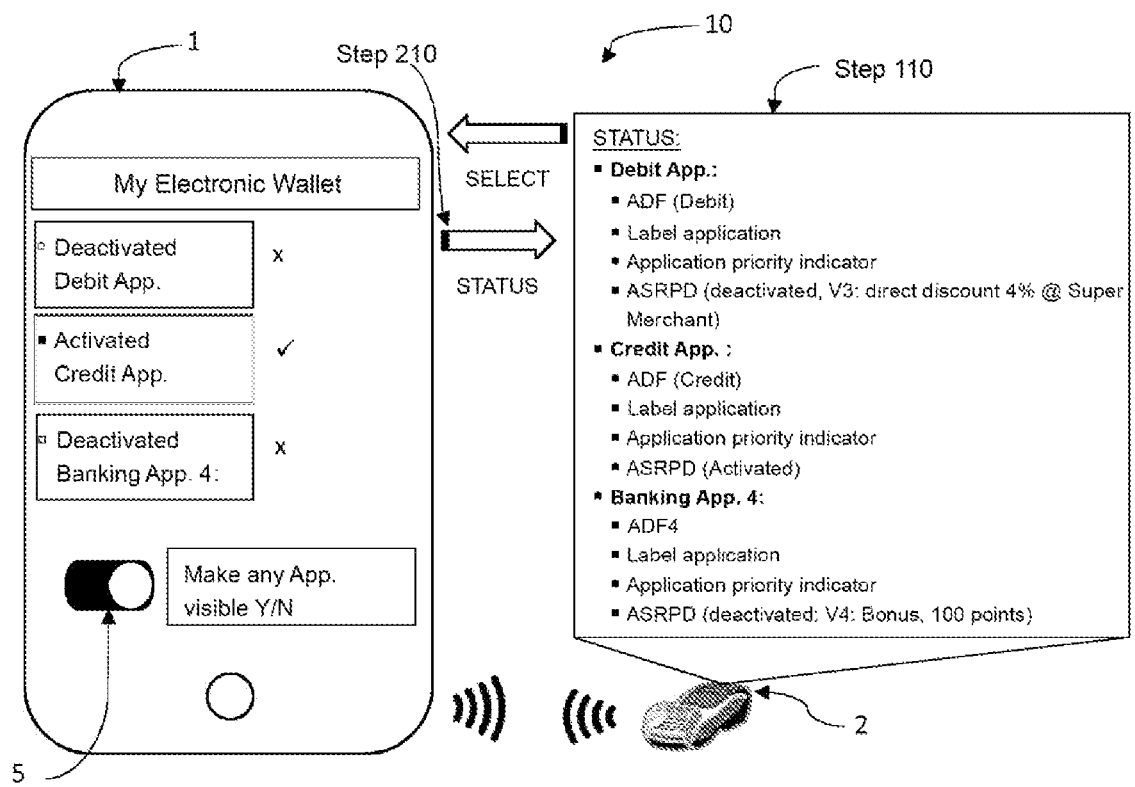
FIG. 4 illustrates a second mode of implementation of the electronic payment transaction method of the invention (and corresponding system)
Figure 4:
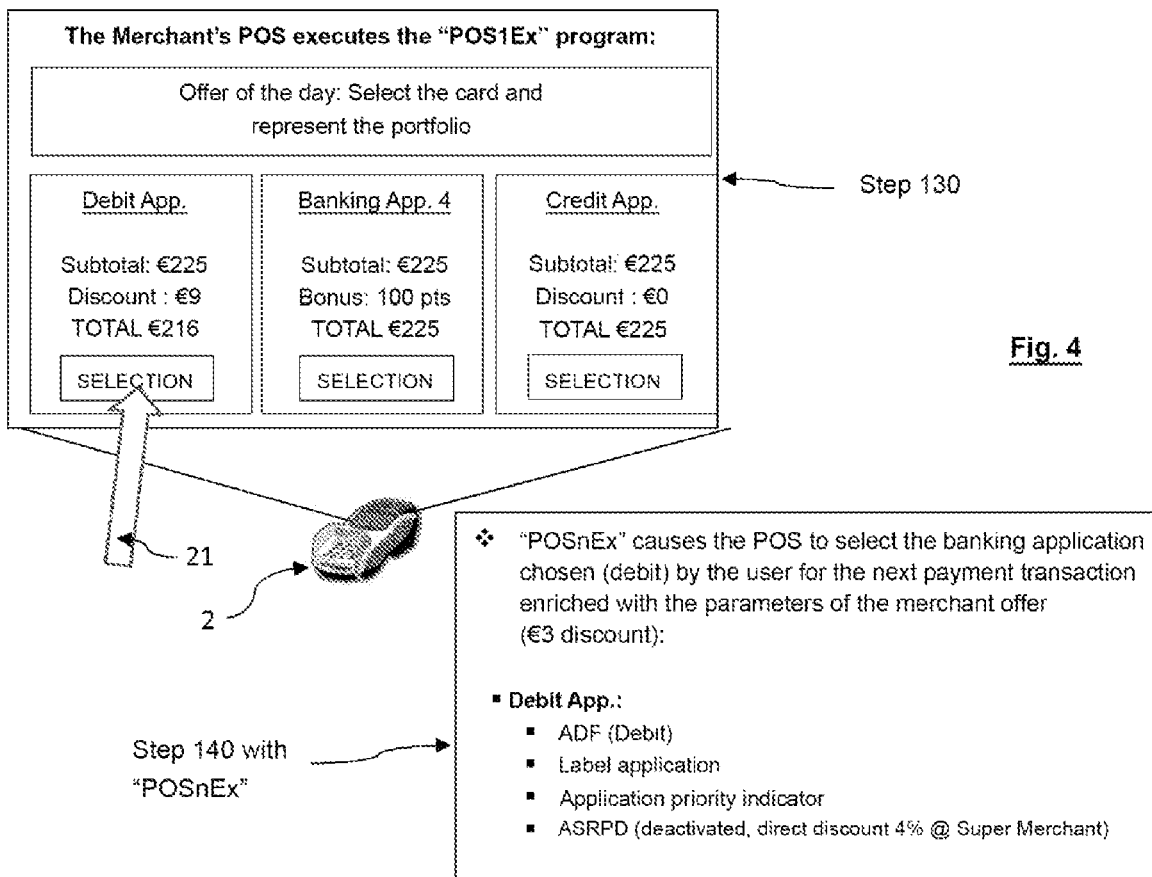
Figure 5:
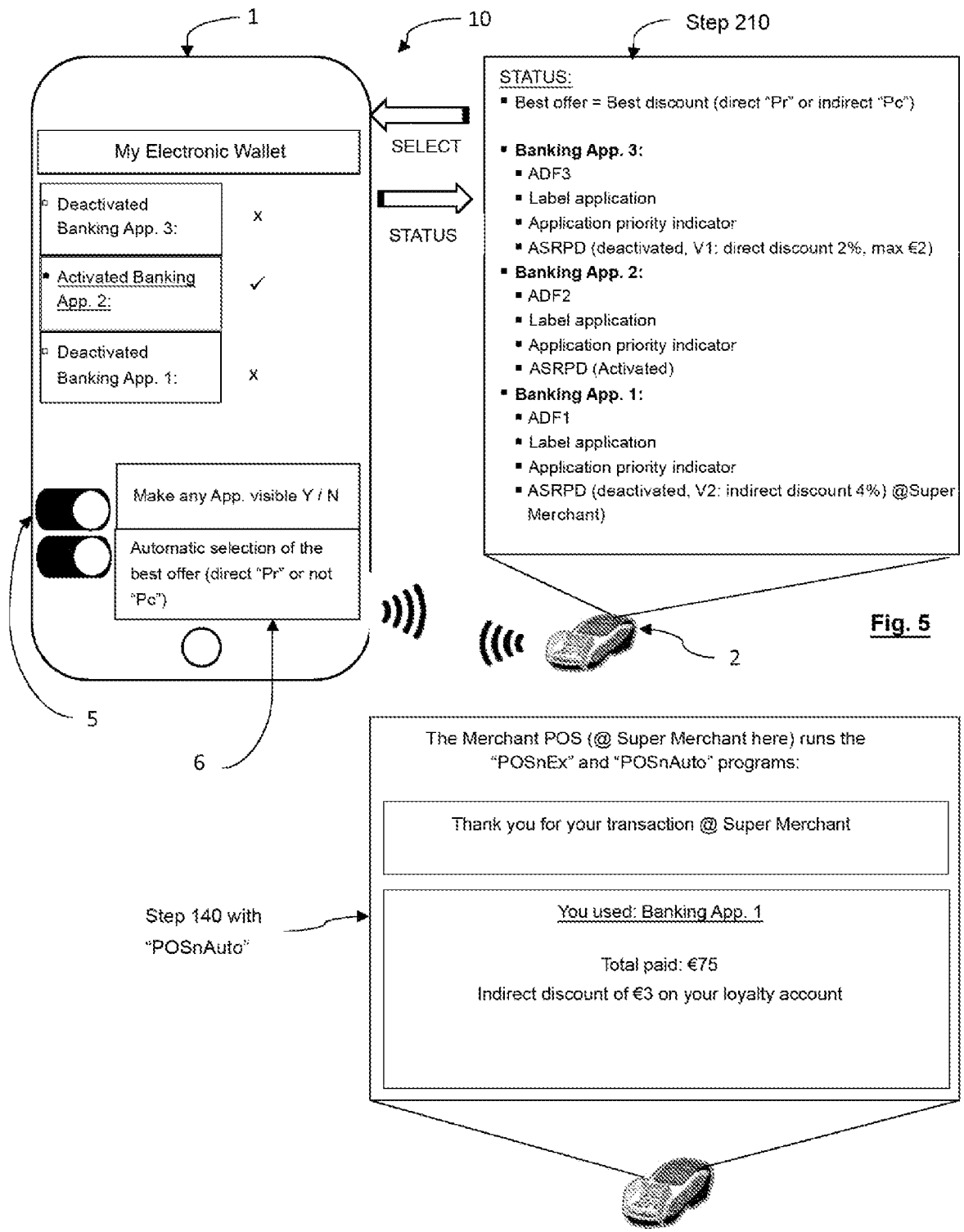
FIG. 5 illustrates a third mode of implementation of the electronic payment transaction method of the invention (and corresponding system)

General Description of FIGS. 3-5

FIGS. 3-5 illustrate different modes of implementing the method of the invention for carrying out a payment transaction on a bank terminal (2, POS) with an electronic payment device (1).

According to one characteristic, the device 1 comprises at least two software payment applications (1-4). Either thereof can be activated (Example 1 bis) or disabled, priority or non-priority. One can be activated while the other is disabled (Example 2bis). All of the applications can be disabled (Example 3bis).

According to another characteristic, the method comprises a step of communicating data from the device to the terminal during a transaction. This data comprises at least information of a first type (ADF2) identifying each payment application of the device 2.

In a first Example 1bis (not illustrated in the figures), at least two payment applications are activated (preferably directly by the user or without otherwise excluding activation, for example, by a server, in particular via OTA) in the device. This activation can cause an insertion of at least the identifier ADFx, ADFy thereof in a PPSE register of the device. This makes it possible to make the activated applications visible in a known manner (as in FIG. 2 for banking applications 1 and 3) by the banking terminal POS 2 during a transaction.

According to another characteristic, the method can also comprise a step of associating economic values of benefit(s) (or incentive measures) for the use of one or the other payment application.

In the examples, these economic benefits or benefit values (incentives) can be allocated by an electronic bank card issuer (or payment software application) such as any bank. These benefits can be introduced into the user's mobile by being associated with the electronic payment application (or card).

The benefits can result from a commercial agreement between a retail chain/merchant and a bank issuing the application or an electronic bank card or the issuer of an electronic wallet hosting several applications or payment cards.

For example, the first benefits (V1-V4) can be introduced using an update or OTA (Over the Air) communication with the mobile from an OTA server centre of an issuing bank or an entity acting on behalf of the issuing bank. These benefits can be added directly to each payment application, in particular in the PPSE register, and taken into account during a transaction, when developing communication fields with the POS. The data fields and formats are preferably as provided by the EMV standard. The data downloaded by OTA can be placed in all the fields of the PPSE register targeted by the invention.

If necessary, second benefits (Vt) can be introduced (alternatively or cumulatively to the first benefits Vt) in the bank terminal 2. The introduction can be carried out by the entities managing the fleet of payment terminals and be associated with bank payment or means of payment applications (Visa Electron, Visa Blue Card, Visa Premier, etc.) or payment system. These second benefits (Vt) can be downloaded or updated in the terminal 2 by any means of communication, in particular by OTA communication or during a connection with a server centre via any computer or radio telecommunication network. These second benefits (Vt) can favour banks issuing payment applications.

Alternatively, if necessary, the invention can provide an additional program DEX1 in the device, configured with instructions for developing "STATUS" responses with data fields (preferably those targeted by the invention) comprising benefits V1-V4 associated with each application when they exist. This can be done with activated or disabled applications.

According to a characteristic of a preferred mode of the invention, the method can comprise a step of configuring the terminal to make a selection, in the terminal, of a payment application as a function of these benefits. The selection can be made in particular manually by a user or automatically. Specifically, the terminal 2 is configured with a POSnEx program explained below to carry out the above-mentioned function. The POSnEx program can comprise instructions configured to extract fields from received communications:

data comprising a first type information containing software application identifiers ADF1, ADF3 of (or electronic payment cards or means of payment), and the first benefits V1-V4 associated with each identifier ADF1, ADF3 . . . .

Alternatively, POSnEx can extract only information of a first type ADF1, ADF3 . . . . Then POSnEx can associate, if necessary, second benefits (Vt not shown) already contained in the terminal (loaded beforehand) or loaded during a connection and interaction with a server centre (30, 31) referred to at the end of the description).

Thus, the invention provides that these benefits V1-V4, Vt can be introduced respectively into the device 1 and/or the terminal 2. POSnEx can thus combine first (V1-V4) and/or second (Vt) benefits respectively from device 1 and/or received in terminal 2 before or during the transaction.

The "POSnEx" program can also comprise instructions for proposing in terminal 2 (FIG. 3, step 130) manual selection of a payment application according to these first (V1-V4) and/or second (Vt) benefits. To this end, the POS can display the resulting benefit for each application and include a human/machine interaction interface (button, touch screen, etc.) allowing the user to select the payment application.

Advantageously (see FIG. 5), the POSnEx program can be supplemented by other instructions to become a "POSauto" program so as to automatically make the selection of the application or electronic payment card.

Being the same category of benefits (called information of the third type), associated with two applications AF1, AF2 . . . , "POSauto" can operate by retaining the most important benefit automatically to select the software application of payment (or means of payment) most interesting for the user and/or the merchant. For example, it can be an immediate discount "Tr" for both, or a deferred discount "Tc" for both, or loyalty points "Tb" for both.

Alternatively, the user can choose a preferred benefit category (information of the third type) over the others. For example, the user can prefer in order an immediate discount "Tr", or a deferred discount "Tc", or loyalty points "Tb". This third type of information can also appear among the data communicated by the device 1 to the terminal 2. It can in particular be placed in one of the fields defined/permitted by EMV, at a predetermined place (or fields described later) of the message, known by the "POSauto" program for the extraction then interpretation and execution thereof. This third type of information can additionally or alternatively be preloaded and activated in terminal 2 to be offered to the user via the terminal or to be applied by default automatically. (However, preferably, it is the user who chooses this on his/her device without the need for preloading in the terminal).

The invention here differs from the prior art defined by EMV which can provide for automatic selection and automatic processing in the POS terminal of a priority payment software application (or means of payment) relative to another non-priority application all two activated. This prior art is not linked to benefits associated with each software payment application. Therefore, the user cannot favour the application providing the best benefit at the time of the transaction.

Specific Description of FIG. 3

In FIG. 3, an Example 2bis of a preferred implementation of the method (or configuration of the system) of electronic payment transaction of the invention is illustrated, in which at least one application among at least two applications is disabled; the POS 2 and the telephone 1 can conform to the modes described above (FIGS. 1 and 2) with the following differences.

According to a very advantageous characteristic of the preferred mode, the data communicated to the terminal 2 during the transaction comprises information (ADF1 or ADF3) of a first type, relating to (or identifying) at least one disabled payment application.

This characteristic differs from the prior art, defined in particular by EMV, which does not envision making the disabled applications of the device 1 visible by the terminal 2. In fact, according to the EMV standard (PPSE and Application Management for Secure Element-Specification Version 1.0 can 2017), only activated applications appearing in the PPSE register have the identifier thereof entered in the "STATUS" response from the device to the terminal.

Therefore, according to a characteristic of this preferred mode, the method can comprise a step of configuring the device 1 so that it stores information of a first type (ADF3) of an application that is disabled in a directory (PPSE) reserved for activated applications. With this configuration, applications that are disabled can be mandatorily mentioned with the identifier thereof (and associated benefits, if applicable) in this reserved directory.

If necessary, the invention can provide for writing, in particular by OTA in the PPSE, application data which are disabled. Likewise, the invention can provide for loading a code or instructions, in particular by OTA, or internet, WIFI, aiming to write in the PPSE data relating to disabled applications.

Alternatively, the disabled ADF3 applications can be listed in a directory, in particular PPSE or other, with the applications activated; they can have a "disabled" indication in a dedicated field in place of the "activated" value. They can comprise an indication of blocking of the application and a reason or indication of a reason for blocking. This allows the invention to not encourage the use of an application which has been disabled due to serious blocking in particular by an issuing bank which would have led to the rejection or refusal of the transaction.

According to a characteristic of a preferred mode of implementation or embodiment, the method comprises a step of configuring the terminal 2 for manual or automatic selection of a payment application according to these benefits in the terminal. The selection can be direct by interaction, notably manual, of the user with the POS.

In the case of Example 1bis (two applications activated), the device 1 cannot be modified/configured compared to the prior art (associated benefits can be preloaded in the bank terminal). Or at the limit, in the case where a first activated application is prioritised over the second by a user, the invention can provide for disregarding the priority and treating the non-priority applications in the same way as those priority.

In the case of Examples 2bis and 3bis (relating respectively to an activated application and a disabled application or two disabled applications), the invention can carry out a processing identical to the non-priority application. More precisely, although being a less preferred concept, the invention can provide for placing (in particular using the DEX1 program which can be linked to the function 5 in FIGS. 3-5) at least the ADF identifier of each disabled application, or (not priority) in one of the fields of communication below targeted by the invention. Thus, although less preferred, the invention can provide a computer program DEX1 in the device 1 the function of which is to systematically place, in a secondary field of the priority and/or activated application (in particular in the PPSE register), the 'ADF1 to ADF4 of at least a second payment application, (even if the latter is not priority or disabled).

Similarly, according to this less preferred concept, if the device contains more than two, or three, or four payment applications, all of the non-priority secondary applications can have the "ADF name" thereof placed in one of the secondary fields of the priority application, or an activated application, in particular in the PPSE register.

Among these secondary fields (targeted by the invention) capable of being filled in and communicated to the terminal, there can be a discretionary data field of FCI transmitters (Tag 'BF0C'), or a field of directory entries (Tag '61') or a proprietary data field of selected application selection (AS-RPD, Tag '9F0A'). ASRPD in English means "Application Selection Registered Proprietary Data"; this field constitutes a sub-field of Directory Entry (Tag '61').

Thus, when the device develops the "status" response thereof in accordance with the EMV standard, this latter response contains not only the ADF of the priority application (activated) but also the identifier ADF of at least one other non-priority or disabled application, or even the ADF of all non-priority or disabled applications contained in the fields referred to above. The targeted fields can thus (according to this less preferred variant) not only contain data of economic benefits or incentives, but also identifiers of payment application.

Alternatively, the DEX1 program can be configured to communicate directly, according to or outside the EMV standard, information relating to several disabled applications. Information of a third type (categories of benefits) can also be loaded into the device and/or the terminal in the same way as the benefits of the first type. The DEX1 program can comprise or implement a menu offering one or the other category of benefits at the user's choice. The category chosen by the user can be placed by the DEX1 program in one of the communication fields targeted by the invention.

Device 1 (telephone) can be configured electronically and/or with the DEX1 program/computer instructions and/or data to generate a "STATUS" response comprising at least information of a first type relating to at least two payment applications activated or disabled or non-priority. The DEX1 program can be configured to associate values of economic benefits, associated with each payment software application and preloaded in a memory of the device.

The invention can provide a mechanism or program (which can be included in DEX1) configured by default to force the device to contain in the PPSE or contain in the STATUS response, in addition to those relating to the activated applications, information relating to at least a second application (activated, disabled, or non-priority).

Preferably, the telephone 1 can be configured for (or comprise) an easily selectable function or option 5 aiming to make all of the banking applications visible or not with visual indicator (I wish to make all my banking applications (or payment means) visible or not). Thus with consent, a user can easily place in the PPSE the information of all the applications present so as to make it visible.

Alternatively, this function or option 5 can be implemented remotely by the user through an actuation instruction, or instruction inciting actuation, communicated in particular by OTA.

According to this function 5, the deactivated applications (marked with a cross) are also filled in or listed or added in addition to the applications activated in the "STATUS" response from the telephone to the POS. This function 5 can be associated with the DEX1 program of the device for directly activation.

For its part, the POS has an execution program "POS-nEx"; this program is configured to read or extract data/information (second information ADF2, ADF3 in addition to first information ADF1) received via "STATUS" and temporarily maintained, in particular in a memory RAM1. The data/information is placed in the aforementioned fields to implement the invention (to recognise other present applications and to propose to use them in particular by proposing an economic benefit).

In the example in FIG. 3, the telephone 1 comprises three payment applications (1-3) of which only the application 2 is activated (as in FIG. 1). However, the payment device 1 transmits in the "STATUS" response ADF3 thereof information relating to at least one other disabled application. Here, second information ADF1, ADF3 relating to the two disabled banking applications 1 and 3, are also transmitted to the POS in the response "STATUS" thereof in response to the request "SELECT" thereof. Only the bank application 2 with first ADF2 information is activated.

The information here comprises for banking application 3:

ADF: ADF3 or Banking App. 3;
The application label (optional);
The ASRPD data: (disabled, V1: 2% discount, max €2).
"STATUS" information comprises here for banking application 2:
ADF: ADF2 or Banking App. 2;
The application label (optional);
The ASRPD data: (Activated).
The information here comprises for banking application 1:
ADF: ADF1 or Banking App. 1;
The application label (optional);
The ASRPD data: (deactivated, V2: 4% discount @ Super Merchant).

Then, the 2 POS reader processes this information received using the μC2 microcontroller thereof which executes a processing software or "POSnEx" program (step 130 in FIG. 3 or FIG. 8), (POSnEx can be stored in a non-volatile EEPROM memory of the POS or associated with the POS, for example using a personalisation or update smart card, which can be read by the POS, in particular during or before the operation thereof).

The "POSnEx" program is executed by integrating or using the data received in the "STATUS" and in particular those data contained in the ASRP field (relating to a rule for calculating economic benefit). The execution of the instructions of the POSnEx program with the data received leads to a presentation of benefits to the user calculated by the POS according to the payment application which will be used.

Thus, using the specific program of the invention "POSnEx", the POS 2 can preferably inform the user (in particular by display on the screen thereof or other, voice message, etc.), the economic benefits which it can provide according to the means of payment (or banking application) chosen for the transaction (step 130 in FIG. 3 or FIG. 8) (in order of best direct and indirect offer):

For the banking application 1, for which the merchant "Super Merchant" offers a V2 credit benefit with a value of 4% "cash back" of €3, for a sub-total and total of €75;
For the banking application 3, the merchant offers an immediate discount benefit V1 having a value of 2% (limited to €1.5 by rule) associated with banking application 3 in the ASRP field, for a sub-total of €75 and total discount (−€1.5) of €73,5;
For the banking application 2, the merchant offers nothing and the subtotal and total is €75.

In a next step, the user observes what will be the economic benefits resulting from the use of each of the three means of payment present in his phone. Then, the user selects (20) the banking application which offers him/her the best benefits, namely the payment means 3 on the POS using a touch screen or the keyboard of the POS. It is the banking application 3 which gives him the largest immediate discount €1.5 (the first application 1 offers more but in a deferred manner). The user is free to make another choice that better meets expectations.

This selection by the user causes the implementation of steps subsequent to POSnEx comprising a selection and activation in POS 2, of a reading banking application "POS3" (corresponding to the payment application 3).

The articulation between the POSnEx and POS3 programs can be carried out in various ways known to those skilled in the art. For example, upon receipt of "status", POSnEx operates in priority with respect to the POS EMV POSn applications, putting the execution of the POSn applications on hold until a display and selection of the user of one amongst them. A user selection loops the POnEx program back to one of the chosen POSn reading applications. In fact, the POS goes, preferably here, into directive interrogation mode forced by the user.

In EMV mode, the POS reader application is implemented by reading the ADF identifier of the activated application read by the POS. All this can be done in a POS based on EMV, except that whether the choice is automatic or not is done on a priority criterion which is in the "PPSE". For example, if there are two applications, one with priority 1 and the other with priority 2, the terminal chooses the first, unless it has been configured to choose the second. If there are two applications with the same priority 1, the user chooses on the POS screen, unless it has been configured to choose the application which interests him/her.

In the next step, after selecting POSn, the user presents his/her telephone again to the POS (if applicable, on possible instructions displayed from the POS). The presentation triggers the embodiment of the contactless transaction by the POS by implementing the banking application 3 selected from the POS reader (corresponding to the banking application card 3 of the telephone). Although the bank card application 3 in the phone is marked as disabled in the ASRPD field, the transaction is still carried out.

Alternatively, several bank card applications can be activated by the user (or by default thanks to a POSnEx step) and visible by the POS via the "STATUS" information sent from the phone in response to the POS EMV request. It is then optional to have a configuration of the telephone necessary for the implementation of a selection of function 5 (I want to make all the payment applications visible).

The information relating to the deactivated application is more informative for the POS. This is not used in the prior art. However, this information does not make the application inactive on the telephone, especially for forced directive use. Configuration (or option) of selection 5 (I want to make all payment applications visible) forces the phone to transmit information even on disabled applications. This selection 5 triggers a storage of the information of all the payment applications present in the PPSE as if it were activated. If necessary, the invention can provide for memorising this information of all the disabled applications as long as they are not blocked.

Specific Description of FIG. 4

In FIG. 4, according to a second mode of implementation or embodiment, the telephone 1 comprises three payment card applications "Debit", "Credit", and "4", of which the "Debit" card application alone is activated. However, in the "STATUS" response thereof, the payment device 1 transmits information relating to at least one other disabled electronic payment card application. Here, information relating to the two disabled bank card applications "Debit" and "4" and that of the activated "Credit" are transmitted to the POS in the response "STATUS" thereof in response to the request "SELECT" thereof:

The information here comprises for the application of "Credit":
ADF: "Credit App." or "ADF (Credit)";
The application label (optional);
The following data from the ASEPD: (Activated)
The information here comprises for the application of "Debit":
ADF: "Debit App." or "ADF (Credit)";
The application label (optional)
The following data from the ASRPD: (deactivated, V3: 4% discount @ "Super Merchant")

In one part of the available field, in addition to the indication of a deactivation, the ASRPD comprises a V3 benefit calculation rule relating to transactions made with a particular merchant (here with the merchant "Super Merchant").

The information here comprises for banking application 4:
ADF: ADF4 or "Banking App. 4";
The label of the banking application 4 (optional)
The following data from the ASRPD: (disabled; V4: Bonus, 100 points)

Thus, thanks to "POSnEx", the POS can display on the screen thereof the expected result (step 130 in FIG. 4 or FIG. 8) of the transaction depending on the application used (in order of the best offer):
For the application of "Debit", a sub-total of €225 and a total of €216 (discounted of €9);
For the "Banking 4" application, the merchant offers a subtotal and a total of €225 with a bonus of 100 points;
For the application of "Credit", the merchant offers nothing and the subtotal and total is €225.

In a next step, the user observes on the POS screen what the expected outcome of the transaction will be for the three payment applications present on his phone. Then, for example, the user selects (21) the application of "Debit" on the POS using a touch screen (or keyboard keys) of the POS. It is the "Debit" application which gives him/her the largest immediate discount (€9).

Using "POSnEx", this selection by the user causes (step 140 in FIG. 3 or FIG. 8) a selection by the POS of a bank card reader application of "Debit" (D1) corresponding to the card application of "Debit" of the phone.

In the next step, the user presents his phone again to the POS (if necessary on possible instructions displayed from the POS). The presentation of the telephone near the POS triggers the embodiment of the contactless transaction by the POS by implementing the bank card reader application of "Debit" "Debit 1" of the POS corresponding to the card application of "Debit" from the phone.

The POSnEx program can carry out the bank transaction by applying the displayed economic benefit linked to the debit bank card.

Alternatively, once the choice has been carried out, it can be a conventional POS program which carries out the transaction. Depending on the case, this can be a total amount which is altered by a direct delivery rule applied/executed by POSnEx and communicated to POSn for processing; this can be loyalty points, or a deferred credit (cash back) applied/executed by POSnEx alongside the execution of the selected bank card reader application.

It should be noted that although the corresponding banking application for "Debit" in the telephone is also marked as being deactivated in the ASRPD field, the transaction is nevertheless carried out in a directive manner.

Specific Description of FIG. 5

In FIG. 5 is described an example substantially identical to that of FIG. 3. It differs in particular in that the telephone comprises or is configured with a selectable function 6 of automatic selection of the merchant's best offer (here direct discount) for the transaction.

Figure 8:
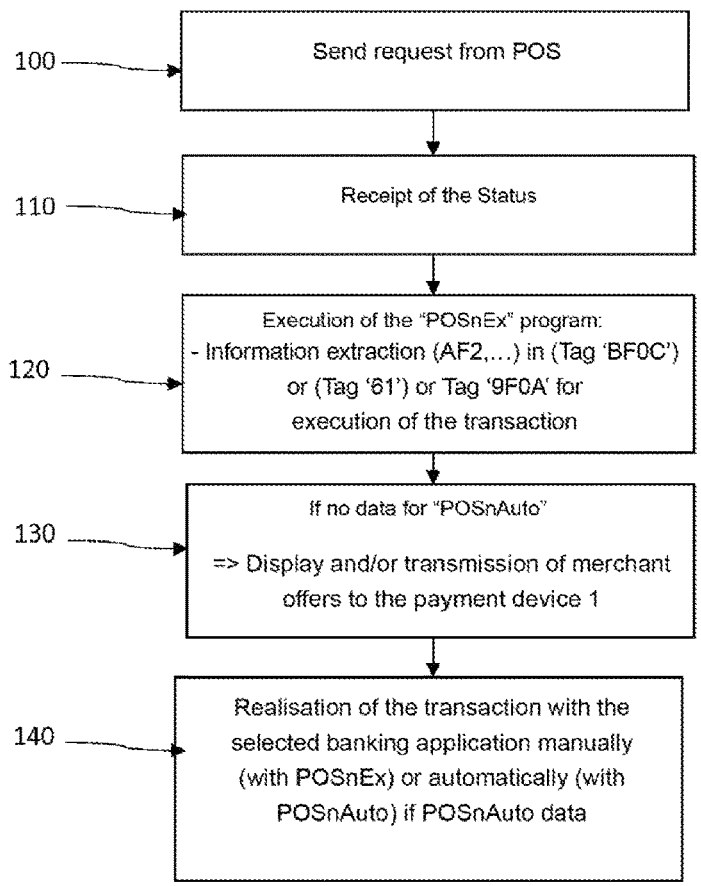

The example here differs in that the information comprised in "STATUS" comprises an additional indication or instruction used for the automatic calculation of the best offer and automatic selection of the best offer or application (step 210 in FIG. 5 or FIG. 8). The example also differs in that it is the banking application 1 which is used instead of the banking application 3 due to a user parameter introduced into the telephone to authorise the automatic selection by the payment terminal of the best direct or indirect offer.

The POS is therefore configured accordingly with a "POSnEx" program and additionally with "POSnAuto" instructions allowing the best offer from the merchant to be automatically calculated possibly according to preferential parameters (or categories of benefits) (Pr, Pf, Pb) of the user which this latter can indicate or activate in the telephone.

The "POSnAuto" program can be triggered by reading an indicator selected by the user. If the indicator is detected by a test, the program plugs into a "POSn" application directly with immediate or deferred delivery values. Therefore, the step of displaying the expected results on the POS is not implemented. The above parameters can comprise a selectable preference, for example, for the best immediate discount "Pr" or the best bonus "Pb" for loyalty points or for the best amount of repayment "Pc" or indirect discount (cash back), etc.

The POS1 program (corresponding to banking application 1 or ADF1) is executed by integrating or using the data received in "STATUS" and in particular those data contained in the ASRP field and the data "Pc" indicating that the best offer is equal to the best indirect discount. The execution of the instructions of the program POS1 with the new data received, therefore leads to automatically determining the best banking application for the user (step 120 in FIG. 5 or FIG. 8).

In a next step (step 140 in FIG. 5 or FIG. 8), using the programs "POSnEx" and "POSnAuto", the POS calculates which will be the best result of the transaction for the three payment applications present in the phone. Then, it automatically selects (22) the bank card reader application POS1 on the POS corresponding to the bank card application 1. It is indeed the bank card application 1 which offers the largest indirect discount (cash back) corresponding to the selection criterion "Pc" preselected by the user.

The POS displays on the screen thereof a presentation of the result and the payment application used:
"Thank you for your transaction at "Super Merchant";
You used the banking application 1,
Total paid €75.
Gain of €3 "cash back" on your loyalty account"

Advantageously, with the automatic selection function of the banking application by the POS in this example, the user need only present his/her telephone once. If necessary, the user might need to present his/her device again to the POS (in particular upon possible instructions displayed from the POS).

The presentation of the device to the POS triggers the embodiment of the contactless transaction by the POS by implementing the bank card reader application POS1 selected from the POS (corresponding to the bank card application 1 of the telephone).

It is observed that, through the invention, although the corresponding banking application 1 in the telephone is marked as being deactivated in the ASRPD field, the transaction is nevertheless carried out, the selection functions 5 and 6 being activated.

Automatic selection can also be carried out in the absence of option 5 activated in the case in particular where several banking applications are activated and therefore communicated to the POS for processing in the "STATUS" information. Preferably, the invention provides that the EMV priority rule will apply if option 5 is disabled.

According to another mode of implementation, the invention can provide for a selection by the user of the type "Among my activated applications (or payment means), I wish to be able to select on the POS terminal the application which offers me the more benefits". As a result, only information relating to activated payment applications is transmitted to the POS.

Alternatively, if the automatic option "POSauto" is selected, the most beneficial transaction (according to the user's pre-selected criteria) can be carried out directly. The user can then be informed of the activated application which has been used and of the benefits obtained.

If necessary, the system 10 can also integrate (not shown) a banking server centre 30 and/or a server centre of (or for) merchants (31) or any other online server centre accounting or carrying out operations related to transactions. During a transaction, telephone 1 and/or POS 2 can interrogate (or interact with) one of the server centres (above) to obtain additional information, particularly economic information (merchant flash offer 32, bank offer 33 . . . , online bonus user account 34, online user loyalty point account 35, online user credit or cash back account 36). The interaction can consist in updating any account (user, merchant or other payment to an association account with any theme, in particular against an illness, ecological, social, patronage, charitable . . . ) remotely online following a transaction.

Thus, the invention makes it possible to widen the possibilities of transactions, benefits, or economic impacts linked to the use of one or the other payment application in a very practical manner for the user.

The mobile phone can connect to a remote server which will give it preferential offers (which will be indicated in a second piece of information). Similarly, the POS can connect to a remote system on which it will increment, for example, a point account following the transaction or inform the user of his/her eligibility for any offer when his/her points reach a threshold.

In the implementation, the invention can provide connections and updates to user accounts 34-36 and/or update of bank offers 33 or merchants 32.

Specific Descriptions of FIGS. 6-9

Figures 6, 7:
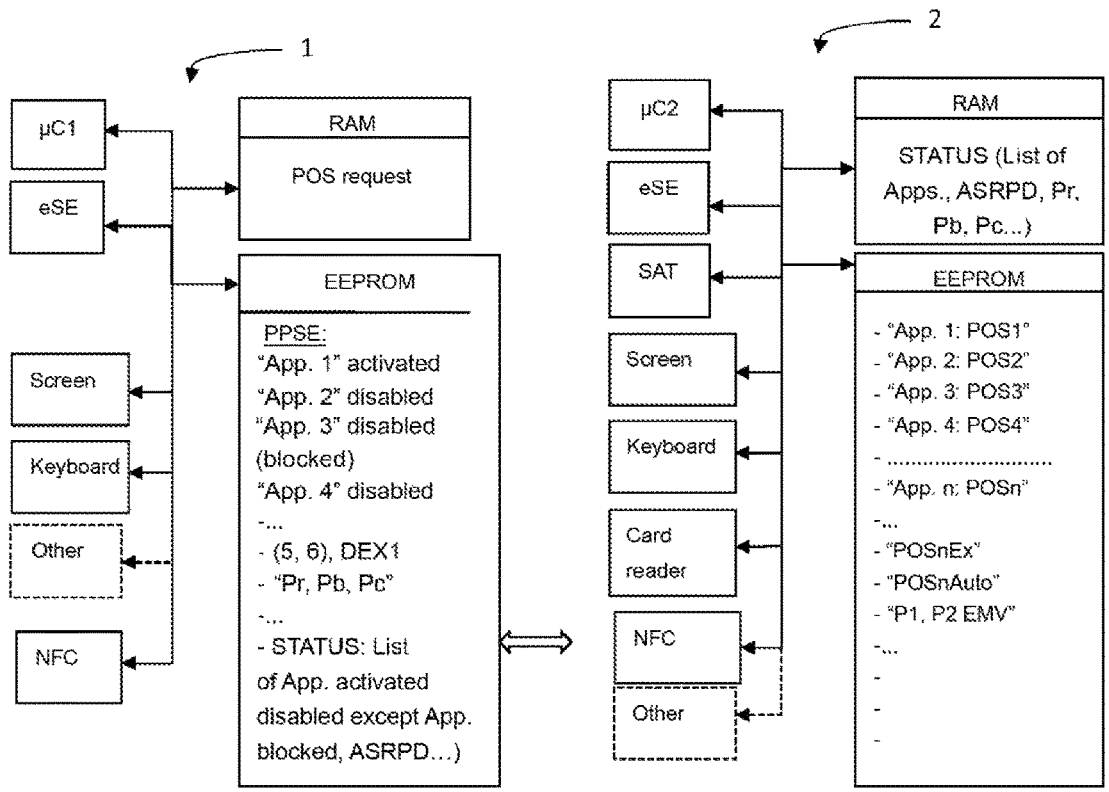
FIGS. 6 and 7, respectively, illustrate an electronic block diagram of the payment device 1 and the payment terminal 2.

FIGS. 6 and 7 respectively illustrate an electronic block diagram of the payment device 1 and payment terminal 2. The constituents mainly comprise a microcontroller μc1 and μc2 connected to working memories RAM and program memory, and communication means, in particular NFC. They can comprise other components or electronic means as indicated in the figures.

In FIG. 8, steps illustrate a preferred mode of implementation of the invention or a program for the payment device 1. Steps 200 to 240 (receipt of request, elaboration of the response, transmission of the response with specific information in the dedicated fields (Tag 'BF0C' or Tag '61' or Tag '9F0A')) are also mostly illustrated in FIGS. 3 to 5.

In FIG. 9, steps illustrate a preferred mode of implementation of the invention or a corresponding program to be executed by μc2 for the payment terminal 2. Steps 100 to 140 (sending request, receiving response, extracting data/specific information from the dedicated fields above, executing the "POSnEx" program with said specific information) are also mostly illustrated in FIGS. 3 to 5.

According to one characteristic, the invention can provide that the data communicated to the terminal by the device can comprise information of a second type indicating why an application is disabled (carrier choice, or blocking of the means of payment by the issuer, etc.).

This second type of information is useful (and preferable), but not strictly necessary. It is not compulsory since, if an application is disabled because it is blocked (in the sense of EMV blocking, and not blocking at the authorisation server level), the "SELECT APP" function (just after the "SELECT PPSE") will return an error, and the terminal will go to the next application in the priority list thereof (EMV behaviour). In this case, the POS can still consider it without compromising the payment.

However, if an application is indicated as disabled because it is blocked by the issuer of the payment means (the bank), it is preferable that the application on the terminal does not offer it (POSnEx)/does not select it (POSnAuto) at the risk of wasting time, particularly in sending the error message.

Independently of the commercial offers which can be associated with each application, in particular banking, the method according to the invention makes it possible not to restrict the functionalities available or at least present in the payment devices (see other device not necessarily for payment but for electronic transaction in general).

The invention allows more flexibility for a user who does not necessarily know which functionalities or applications are present in his/her device or are usable at a given instant in relation to a given terminal. An application could be activated, downloaded remotely in the meantime without the user having really realised the presence or possibilities thereof.

A user can have reasons other than economic reasons for choosing such or such application, such as for example the level of security associated with the terminals or with the transaction itself (for example level of repudiation), the speed of the transaction, the confidentiality of the transactions, or the certification of certain applications in relation to others.

The invention can be applied to electronic transaction devices in general other than those intended for making payments. The invention can be applied to make various transactions other than in relation to a bank terminal (for example with any transaction terminal transport terminal, access terminal . . . ).

The invention claimed is:

1. A method for carrying out a payment transaction on a bank terminal with an electronic payment device, said device comprising at least two payment applications, among which at least one payment application has a disabled status and the rest have an activated status according to EMV standard, each payment application comprising an identifier (ADF Name), said device performing steps of the method comprising:
   inserting the identifiers of the disabled and activated payment applications in a Proximity Payment System Environment (PPSE) register of the device, for at least one of the payment applications, receiving, by the bank terminal and/or the electronic payment device, economic values of advantages for the use thereof and associating these values with the corresponding payment applications,
   communicating data to the terminal during a transaction, said data comprising at least information of a first type identifying each enabled and activated payment application of the device, wherein the terminal computes the respective economic advantages of using each of the enabled and disabled payment applications during the transaction and allows its selection.

2. The method according to claim 1, comprising making a manual or automatic selection in the terminal of a payment application according to these advantages.

3. The method according to claim 2, comprising storing said data in a directory reserved for enabled applications.

4. The method according to claim 2, wherein said data comprise information of a second type indicating whether a disabled application is blocked in an authorisation server.

5. The method according to claim 1, wherein said communicated data comprise information of a third type, said third type relating to categories of preferential advantages preselected by a user in their device.

6. The method according to claim 1, wherein said data communication takes place in a response of the device to a request from the terminal in accordance with the EMV standard.

7. The method according to claim 1, wherein said communicated data are placed in an FCI issuer discretionary data field, in a directory entries field or in an application selected registered proprietary data field.

8. A system for carrying out a payment transaction on a bank terminal with an electronic payment device, wherein the system comprises the bank terminal and the electronic payment device, said device comprising a microcontroller connected to a memory storing at least two payment applications, among which at least one payment application has a disabled status and the rest have an activated status according to EMV standard, each payment application comprising an identifier (ADF Name), and communications means to communicate information with the terminal, wherein:

the microcontroller of the device inserts the identifiers of the disabled and activated payment applications in a Proximity Payment System Environment (PPSE) register of the memory of the device, for at least one of the payment applications, receiving, by the bank terminal and/or the electronic payment device, economic values of advantages for the use thereof and associating these values with the corresponding payment applications, the microcontroller of the device communicates, through the communication means, data to the terminal during a transaction, said data comprising at least information of a first type identifying each payment application of the device, wherein the terminal computes the respective economic advantages of using each of the enabled and disabled payment applications during the transaction and allows its selection.

9. The system according to claim 8, wherein said information of the first type is placed in an FCI issuer discretionary data field or in a directory entries field or in an application selected registered proprietary data field.

10. The system according to claim 8, comprising a banking server center and/or a merchant server center that, during a transaction, the device and/or the terminal interrogate(s) one of said server centers to obtain additional economic information or interact with these servers.

\* \* \* \* \*